J. G. A. STRANDELL.
CONNECTOR.
APPLICATION FILED APR. 24, 1919.
1,323,655.
Patented Dec. 2, 1919.
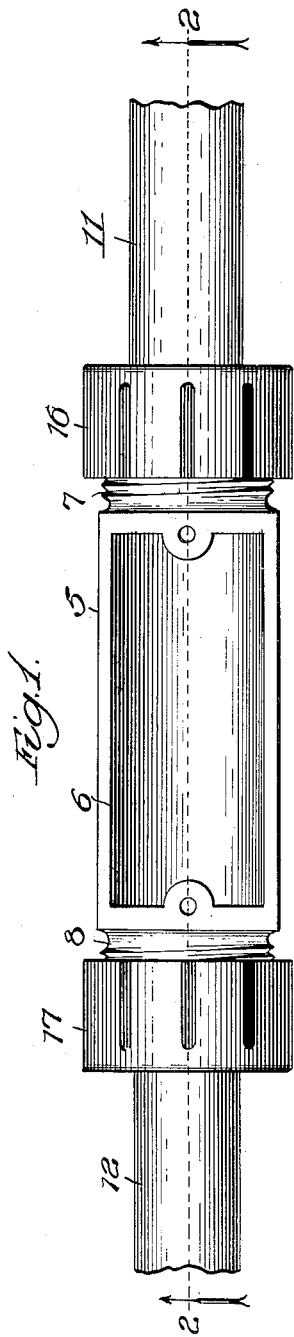
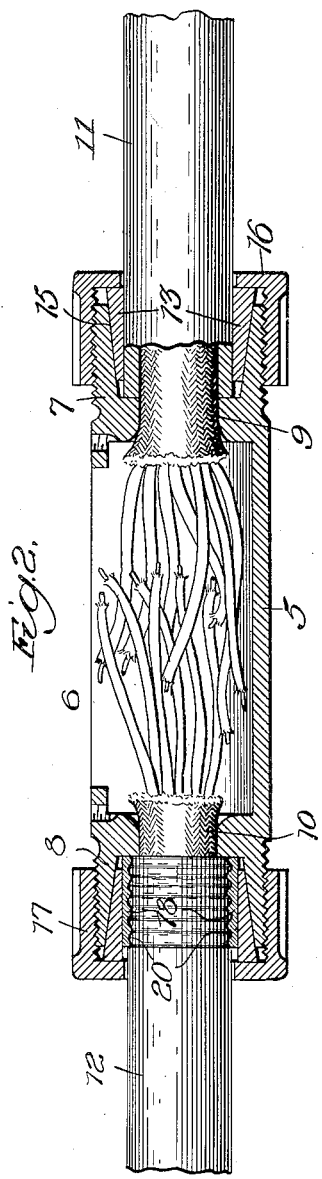
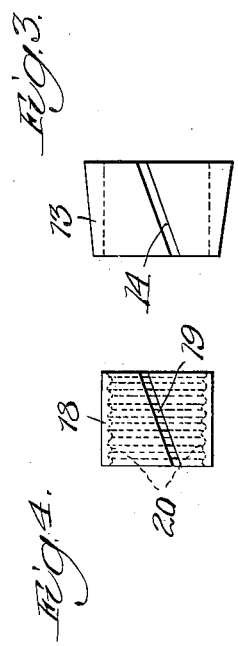
Inventor,
Johannes G. A. Strandell,

UNITED STATES PATENT OFFICE.

JOHANNES G. A. STRANDELL, OF CHICAGO, ILLINOIS.

CONNECTOR.

1,323,655.

Specification of Letters Patent.

Patented Dec. 2, 1919.

Application filed April 24, 1919. Serial No. 292,337.

*To all whom it may concern:*

Be it known that I, JOHANNES G. A. STRANDELL, a citizen of the United States, residing at 6935 So. Laflin St., Chicago, in the county of Cook and State of Illinois, have invented a new and useful Improvement in Connectors, of which the following is a specification.

My invention relates more particularly to improvements in means for connecting electric wires, cables, or the conduits carrying them to terminal boxes or other fittings, such wires and cables in accordance with common practice being sheathed in various ways, as for example, by lead sheeting, tape or jute, the latter saturated with a waterproofing compound.

My object is to provide for the rigid connecting of the wires, cables or conduits to terminal boxes, or other fittings, and to accomplish this without impairing the sheathing of the wires or cables or the conduit, and by means of a simple and economical construction of device.

Referring to the accompanying drawing:—

Figure 1 is a view in side elevation of a terminal box with an electric cable connected with one end of the box and a conduit for wires connected with its opposite end, in accordance with my invention. Fig. 2 is a longitudinal sectional view of the structure shown in Fig. 1 which shows at one end a desirable form of connection where a conduit is to be connected with the box and at its opposite end a desirable form of connection where a cable, sheathed by soft material, as for example by tape, jute or lead sheeting, is to be connected to the box. Fig. 3 is a view in side elevation of the clamping ring employed in both connections illustrated; and Fig. 4 a similar view of an auxiliary ring employed in the connection at the left-hand side of Fig. 2.

In the drawings I have shown my invention as applied to a terminal box represented at 5, this box as shown being in the form of a casting adapted to be closed at its open side 6, by a suitable cover-plate (not shown) and provided by way of illustration, at opposite ends with hollow bosses 7 and 8 externally threaded as represented, and through which bosses the electric wires 9 and 10, which lead into the box, extend the cable 10 being shown as sheathed with relatively soft or yielding sheathing material 12, as for example tape, jute or sheeted cable, or with lead.

The connection for the conduit shown at 11 at the right-hand side of Fig. 2 and through which the wire 9 extends, involves a clamping ring 13 split diagonally relative to the median line of the ring, as represented at 14, the inner surface of this ring being cylindrical and its outer surface conical, this ring surrounding the conduit 11 and entering at its small end between the conduit 11 and the outwardly-flaring conical inner surface 15 of the boss 7. The ring 13 coöperates with a compression cap 16 which surrounds the conduit, screws upon the threaded portion of the boss 7 and operates by engaging the outer end of the ring 13 to force the latter along the conical surface 15 and into rigid clamping engagement with the conduit 11, the ring 13 contracting as it is forced inwardly by the screwing of the cap 16 upon the boss 7.

In the arrangement shown at the left-hand side of Fig. 2 where the cable is sheathed with a soft material 12, it is preferred that the portion of the clamping means for the cable which directly engages the sheathing be of such form, as for example corrugated, as to become embedded in the sheathing. This is preferably carried out by providing in addition to the clamping ring 17 of the same construction as the ring 13, an inner ring 18 split diagonally as represented at 19, and presenting a roughened or corrugated inner surface as represented at 20, this ring being of cylindrical form and surrounded by the clamping ring 17 which is driven into clamping position by the compression cap 21, like the cap 16, screwed upon the boss 8. If desired the ring 17 and ring 18 may be made of one piece.

The feature of providing the diagonally split clamping ring is of importance as thereby, as has been demonstrated in practice, the wire, cable or conduit, as the case may be, is gripped to the box or other fitting more rigidly than in the case of a ring split otherwise. Furthermore this feature presents the advantage in the use of the connection with a wire or cable sheathed with fabric or soft metal, of presenting a greater length of joint packed by material of the sheathing which is displaced into the slit of the clamping ring by the action of the ring in being contracted, While I have illustrated and described a particular construction embodying my invention, I do not wish to be understood as intending to limit it thereby as the same may be variously modified and altered without departing from the spirit of my invention.

What I claim as new and desire to secure by Letters Patent is:

1. A terminal box having an apertured threaded member rigidly projecting therefrom for receiving an electric wire, cable, or conduit, the inner surface of said member being tapered, a split clamping ring located within the said tapered inner surface and surrounding the wire, cable, or conduit and engaging at its outer surface the tapered inner surface of said member and slidable on the part which it surrounds, that portion of said ring at which it bears against the part which it surrounds being relatively long, and a compression-cap screwed upon said threaded member and screwing against said ring and free to screw on said member except as restrained by said ring.

2. In combination an apertured member, an element extending lengthwise therein, said member being threaded with its aperture outwardly flaring, a clamping-ring split diagonally and surrounding said element and located in the flaring portion of said aperture, an auxiliary split clamping-ring having an irregular surface surrounding said element and surrounded by said first named clamping-ring, and a compression member screwing upon the threaded portion of said apertured member and engaging said clamping-ring, for the purpose set forth.

JOHANNES G. A. STRANDELL.